US012561901B2

(12) United States Patent
Hori et al.

(10) Patent No.: US 12,561,901 B2
(45) Date of Patent: Feb. 24, 2026

(54) VIRTUAL REALITY BASED PROGRAMMING SUPPORT SYSTEM AND METHOD

(71) Applicant: HITACHI, LTD., Tokyo (JP)

(72) Inventors: Akihiro Hori, Tokyo (JP); Masumi Kawakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 18/041,837

(22) PCT Filed: Mar. 2, 2021

(86) PCT No.: PCT/JP2021/008008
§ 371 (c)(1),
(2) Date: Feb. 16, 2023

(87) PCT Pub. No.: WO2022/038809
PCT Pub. Date: Feb. 24, 2022

(65) Prior Publication Data
US 2024/0013481 A1     Jan. 11, 2024

(30) Foreign Application Priority Data

Aug. 18, 2020   (JP) ................................. 2020-138277

(51) Int. Cl.
G06T 7/20       (2017.01)
G06T 17/00      (2006.01)
G06V 10/74      (2022.01)
(52) U.S. Cl.
CPC ................ G06T 17/00 (2013.01); G06T 7/20 (2013.01); G06V 10/761 (2022.01); G06T 2207/30241 (2013.01)

(58) Field of Classification Search
CPC ....... G06F 3/01; G06F 3/0346; G06V 10/761; G06V 40/20; G06T 7/20; G06T 17/00; G06T 2207/30241
(Continued)

(56) References Cited

U.S. PATENT DOCUMENTS 5,481,625 A       1/1996  Suzuki
10,801,841 B1 *  10/2020  Rintoul .................. G01C 21/20
(Continued)

FOREIGN PATENT DOCUMENTS

JP         H05-290221 A      11/1993
JP         2012-160204 A      8/2012
(Continued)

OTHER PUBLICATIONS

International Search Report, mailed May 18, 2021, for International Application No. PCT/JP2021/008008.
(Continued)

*Primary Examiner* — Jacinta M Crawford
(74) *Attorney, Agent, or Firm* — Baker Botts L.L.P.

(57)                ABSTRACT

To support creation of an editable information expression of a predetermined language in a virtual reality space, an information expression creation support device is provided. The device supports creation of an editable information expression source code of the predetermined language in the virtual reality space by tracking a movement trajectory of an action of a creator and selecting an information expression from candidates of the information expression, which are prepared in advance, based on an acquired movement trajectory of an action of the creator, and the selected information expression is arranged at a predetermined position.

8 Claims, 15 Drawing Sheets

(58) Field of Classification Search
USPC ........................................................... 345/419
See application file for complete search history.

(56) References Cited

U.S. PATENT DOCUMENTS

| | | | | |
|---|---|---|---|---|
| 2007/0139370 | A1* | 6/2007 | Lu ........................... | G06F 3/011 |
| | | | | 345/156 |
| 2015/0220265 | A1 | 8/2015 | Takahashi | |
| 2017/0242581 | A1 | 8/2017 | Couelier et al. | |
| 2018/0136721 | A1 | 5/2018 | Alleaume et al. | |
| 2019/0094534 | A1 | 3/2019 | Yamaura et al. | |

FOREIGN PATENT DOCUMENTS

| | | | |
|---|---|---|---|
| JP | 2013-114431 | A | 6/2013 |
| JP | 2015-148946 | A | 8/2015 |
| JP | 2018-081694 | A | 5/2018 |
| JP | 2019-061590 | A | 4/2019 |
| JP | 2019-512765 | A | 5/2019 |
| WO | WO 2008/018274 | A1 | 2/2008 |

OTHER PUBLICATIONS

Notice of Reasons for Refusal, mailed Jan. 9, 2024, for Japanese Application No. 2020-138277 (with English translation).
Onishi, et al., Operation Interface in Immersive VR Programming Environment, The Institute of Electronics, Information and Communication Engineers, IEICE Technical Report, pp. 85-88 (2019) (with English translation).

* cited by examiner

[FIG. 1]
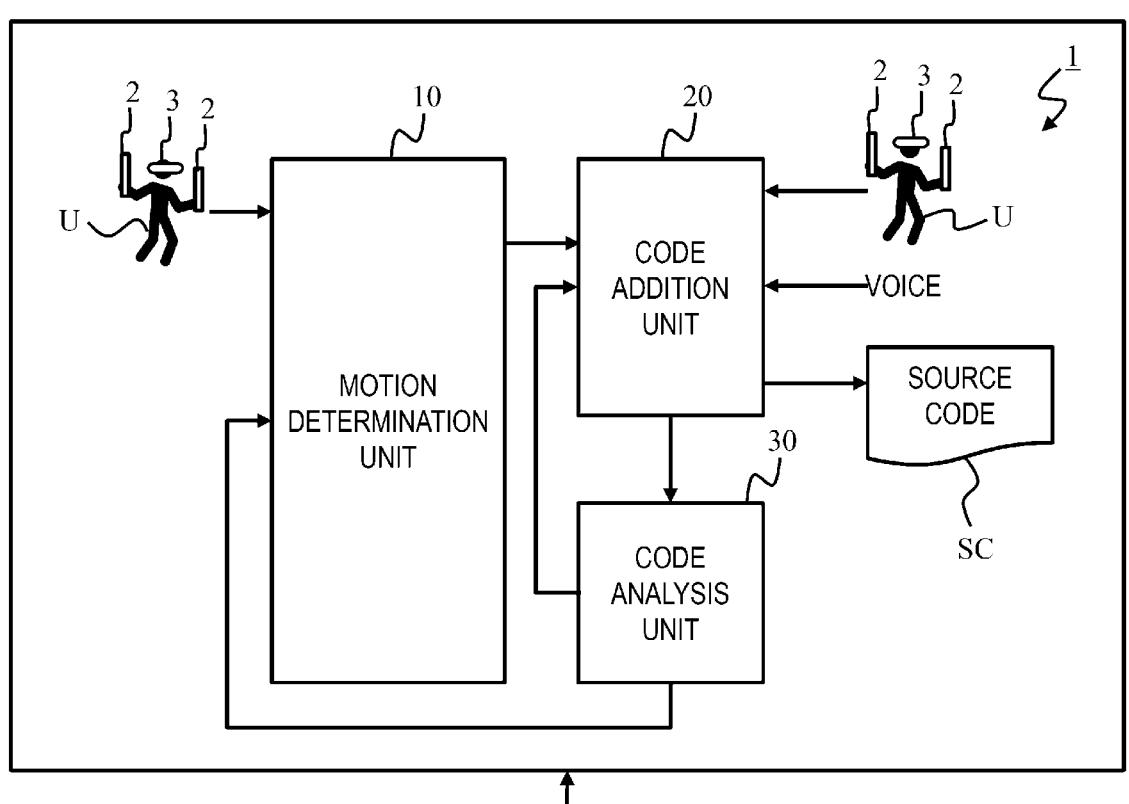
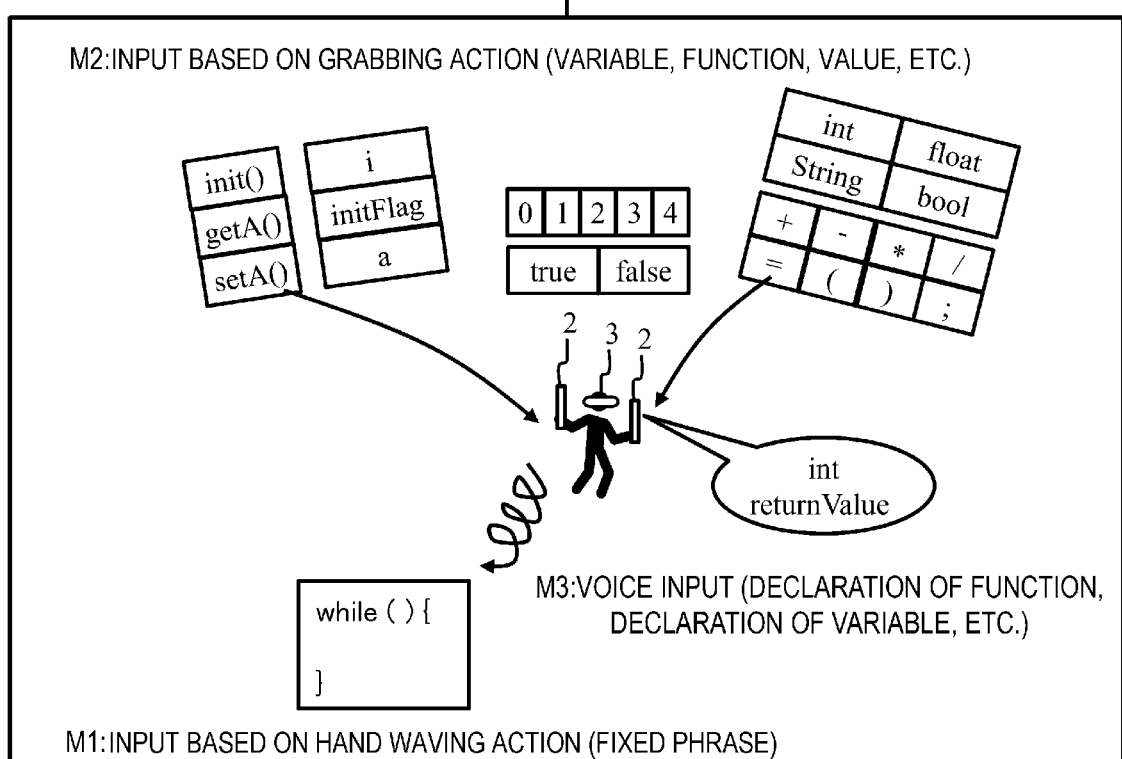

[FIG. 2]
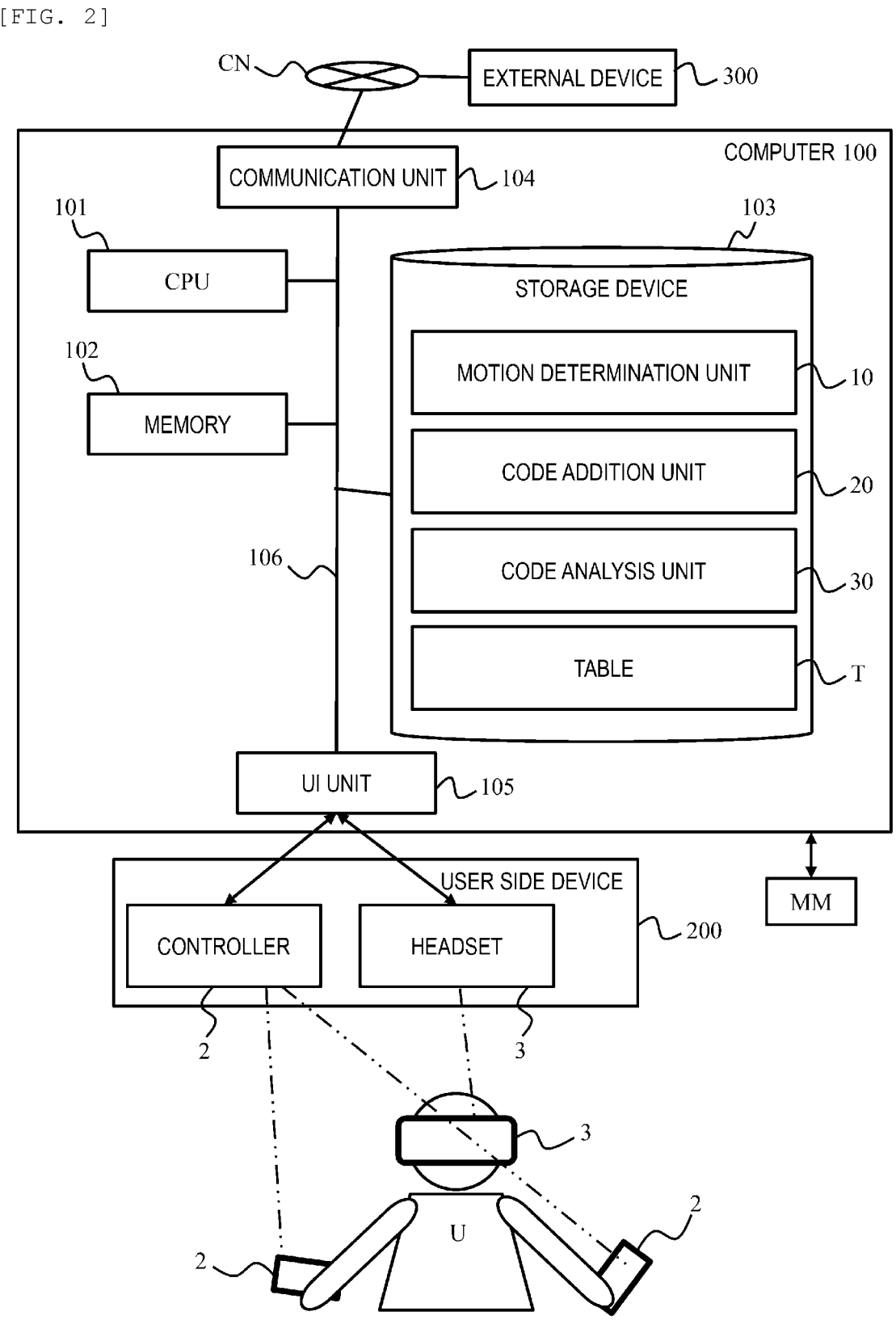

[FIG. 3]
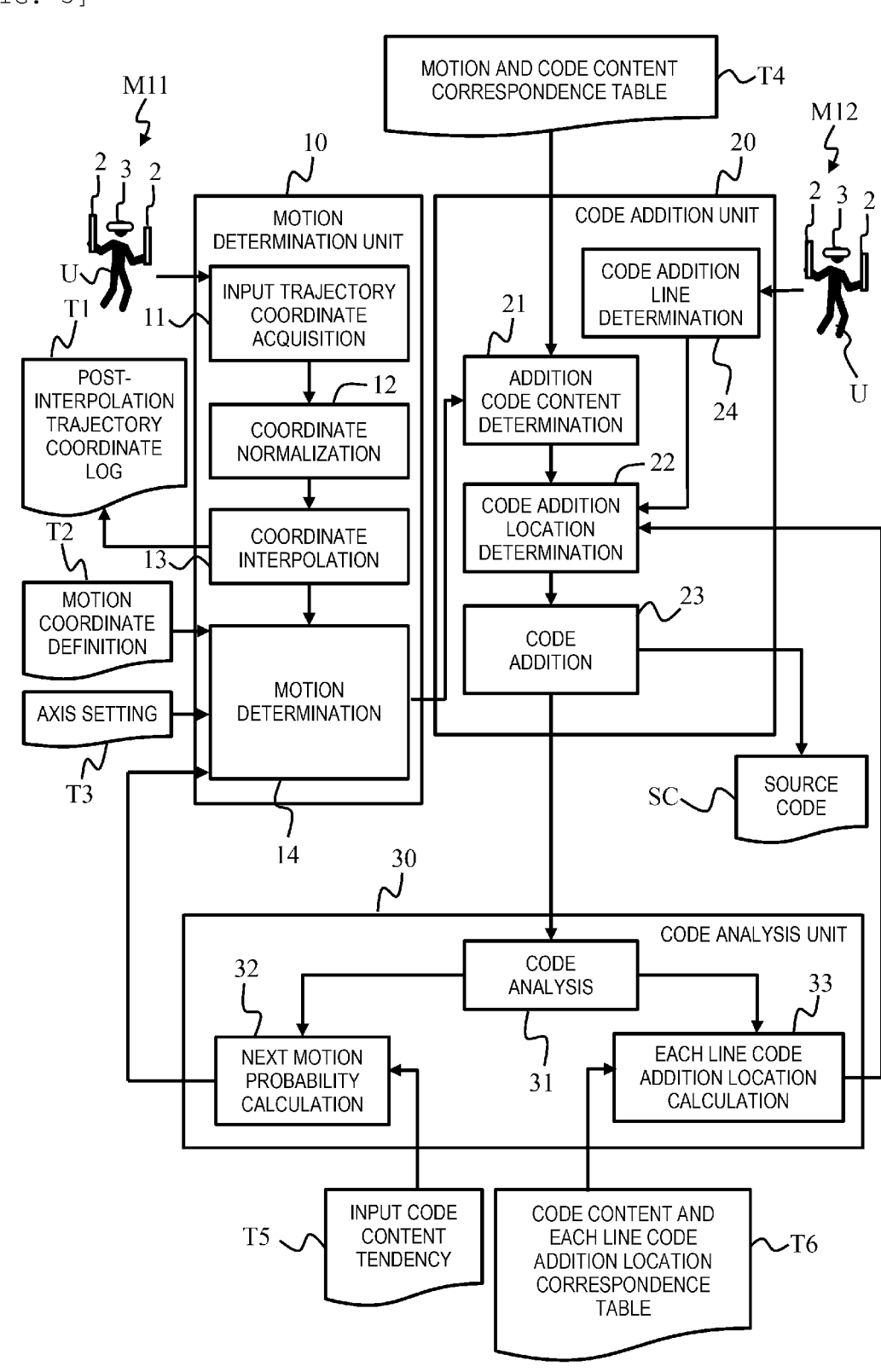

[FIG. 4]

| MOTION OCCURRENCE TIME | RIGHT AND LEFT | AXIS | POST-INTERPOLATION TRAJECTORY COORDINATES |
|---|---|---|---|
| 2020/9/1 09:00:00 | RIGHT HAND | X | [0, 33, 64, 32, −5, 24, 75, 45, 21, 0] |
| | | Y | [0, −10, −23, −29, −35, −37, −42, −45, −50, −54] |
| | | Z | [0, 0, 1, 2, 1, 2, 1, 3, −1, −3] |
| | LEFT HAND | X | [0, 26, 66, 32, 0, 24, 72, 54, 32, −4] |
| | | Y | [0, −17, −28, −39, −45, −47, −52, −55, −61, −63] |
| | | Z | [0, 1, 0, 0, 0, −2, 5, 2, −1, −4] |
| 2020/9/1 09:00:20 | RIGHT HAND | X | [0, 2, 1, 4, 2, −1, 2, 4, 0, 3] |
| | | Y | [0, 1, 2, 4, 2, 1, 3, 1, 1, 4] |
| | | Z | [0, 23, 45, 31, 75, 52, 77, 89, 95, 91] |
| | LEFT HAND | X | [0, 1, −3, 1, 7, 0, 4, 0, 2, −3] |
| | | Y | [0, 4, 5, 2, 3, 1, 2, 4, 0, 3] |
| | | Z | [0, 24, 42, 41, 55, 61, 72, 85, 91, 92] |

| MOTION NAME | MOTION NUMBER | RIGHT AND LEFT | AXIS | TRAJECTORY COORDINATES |
|---|---|---|---|---|
| IF | 1 | RIGHT HAND | X | [0, 31, 69, 42, −3, 27, 72, 55, 21, −9] |
| | | | Y | [0, −10, −23, −29, −35, −37, −42, −45, −50, −54] |
| | | | Z | [0, 0, 1, 2, 1, 2, 1, 3, −1, −3] |
| | | LEFT HAND | X | [0, 32, 66, 43, −2, 25, 73, 54, 22, −6] |
| | | | Y | [0, −11, −22, −27, −34, −34, −43, −48, −54, −62] |
| | | | Z | [0, −1, 4, 2, 1, 1, 0, 2, 3, 2] |
| | | | | ... |
| | 5 | RIGHT HAND | X | [0, 33, 64, 32, −5, 24, 75, 45, 21, 0] |
| | | | Y | [0, −10, −23, −29, −35, −37, −42, −45, −50, −54] |
| | | | Z | [0, 0, 1, 2, 1, 2, 1, 3, −1, −3] |
| | | LEFT HAND | X | [0, 26, 66, 32, 0, 24, 72, 54, 32, −4] |
| | | | Y | [0, −17, −28, −39, −45, −47, −52, −55, −61, −63] |
| | | | Z | [0, 1, 0, 0, 0, −2, 5, 2, −1, −4] |
| MAIN | 1 | RIGHT HAND | X | [0, 2, 1, 4, 2, −1, 2, 4, 0, 3] |
| | | | Y | [0, 1, 2, 4, 2, 1, 3, 1, 1, 4] |
| | | | Z | [0, 23, 45, 31, 75, 52, 77, 89, 95, 91] |
| | | LEFT HAND | X | [0, 1, −3, 1, 7, 0, 4, 0, 2, −3] |
| | | | Y | [0, 4, 5, 2, 3, 1, 2, 4, 0, 3] |
| | | | Z | [0, 24, 42, 41, 55, 61, 72, 85, 91, 92] |
| | | | | ... |
| | 5 | RIGHT HAND | X | [0, 1, 3, 1, 2, −4, −2, −1, 1, 3] |
| | | | Y | [0, 4, 5, 2, 3, 0, 0, 1, 2, 1] |
| | | | Z | [0, 22, 43, 42, 51, 63, 71, 84, 91, 91] |
| | | LEFT HAND | X | [0, 2, 1, 1, 4, 0, 4, 1, −1, 2] |
| | | | Y | [0, 4, −2, −1, 2, 1, 3, 2, 1, 0] |
| | | | Z | [0, 22, 41, 42, 51, 60, 71, 84, 92, 94] |
| | | | | ... |

T2   C21   C22   C23   C24   C25   C26   C27

[FIG. 6]
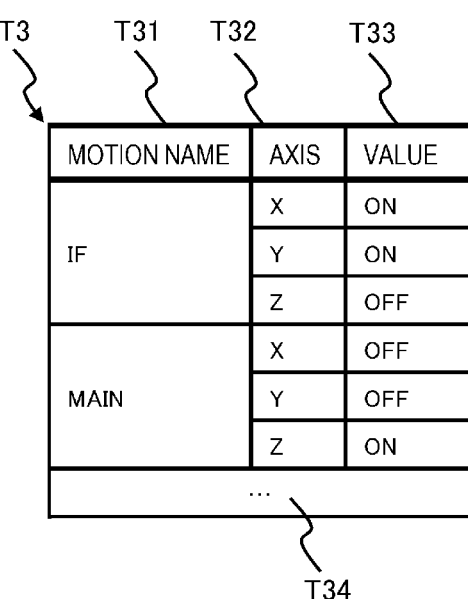
| MOTION NAME | AXIS | VALUE |
|---|---|---|
| IF | X | ON |
| | Y | ON |
| | Z | OFF |
| MAIN | X | OFF |
| | Y | OFF |
| | Z | ON |
| ... | | |

[FIG. 7]
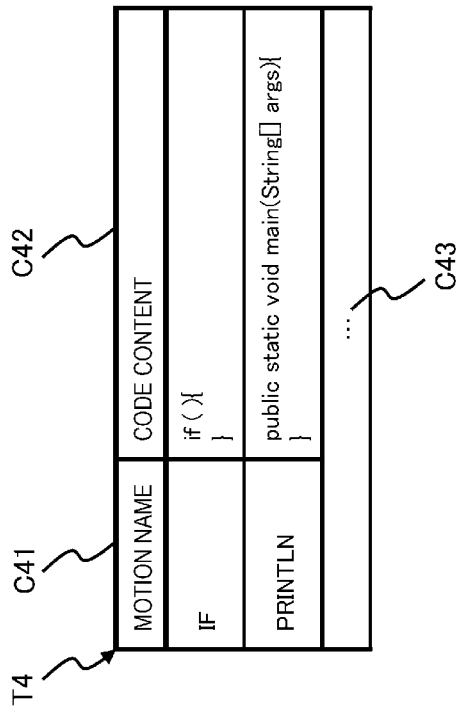

[FIG. 8]
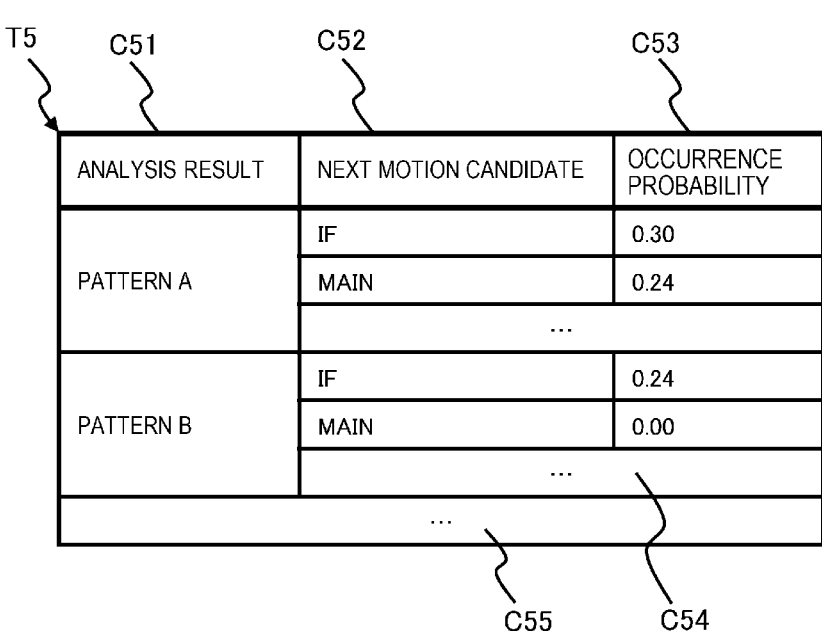
| ANALYSIS RESULT | NEXT MOTION CANDIDATE | | OCCURRENCE PROBABILITY |
|---|---|---|---|
| PATTERN A | IF | | 0.30 |
| | MAIN | | 0.24 |
| | ... | | |
| PATTERN B | IF | | 0.24 |
| | MAIN | | 0.00 |
| | ... | | |
| ... | | | |

[FIG. 9]
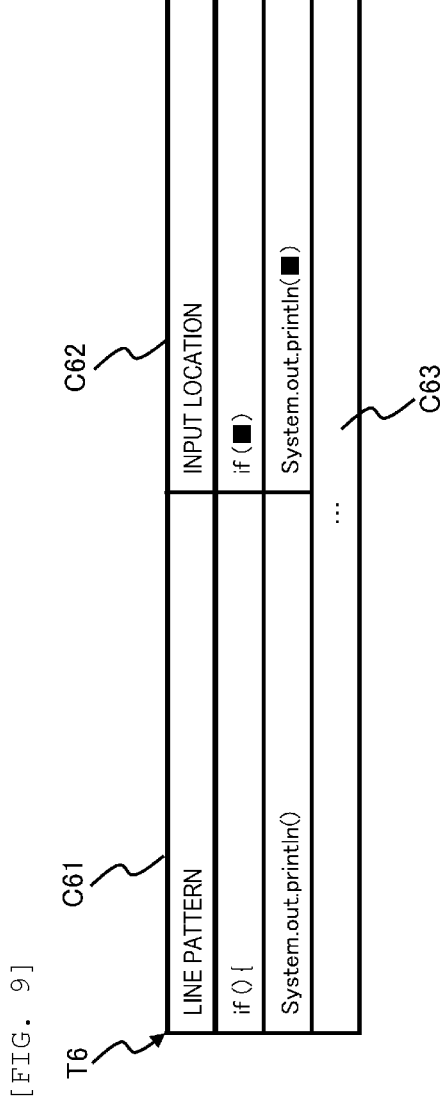

[FIG. 10]
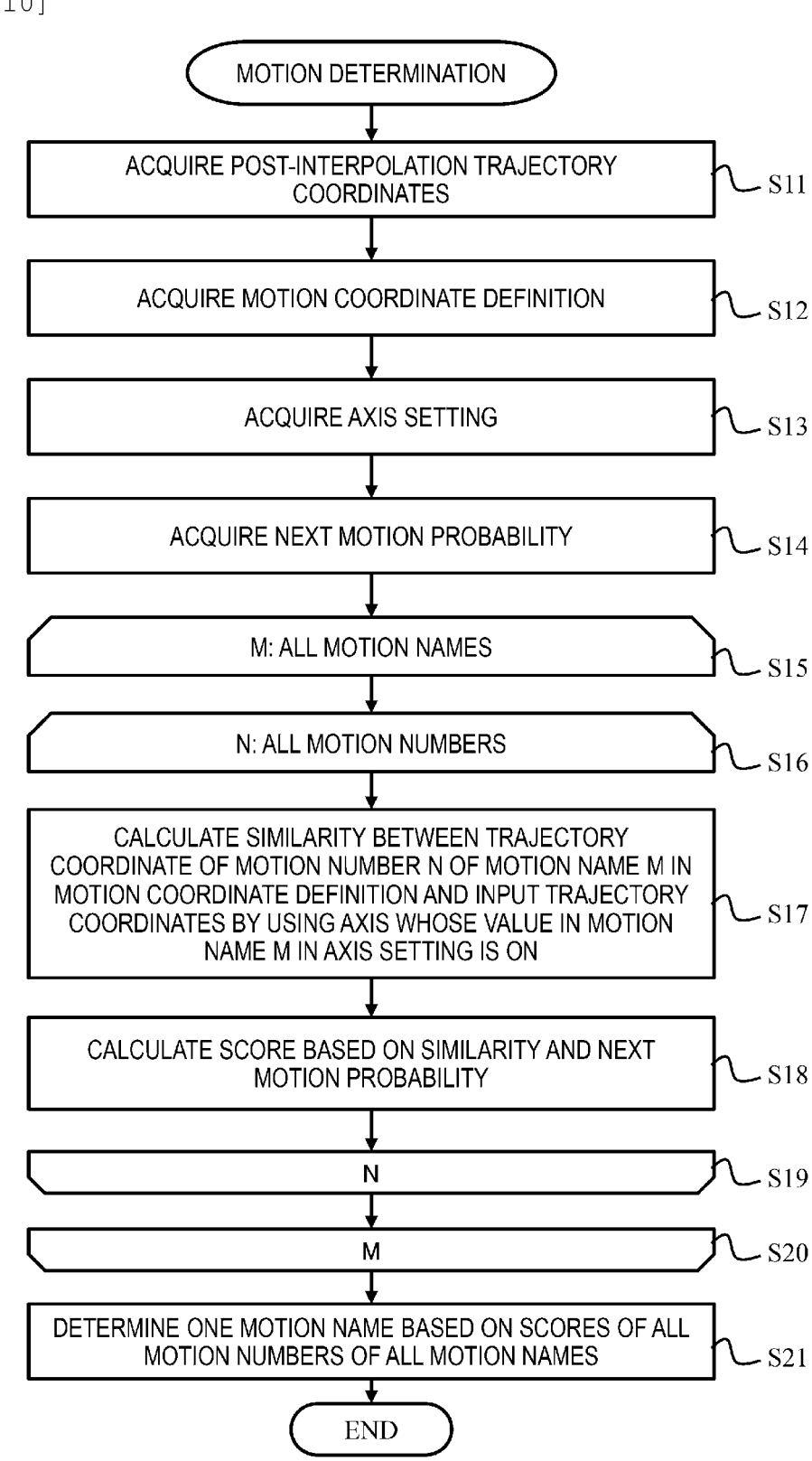

[FIG. 11]
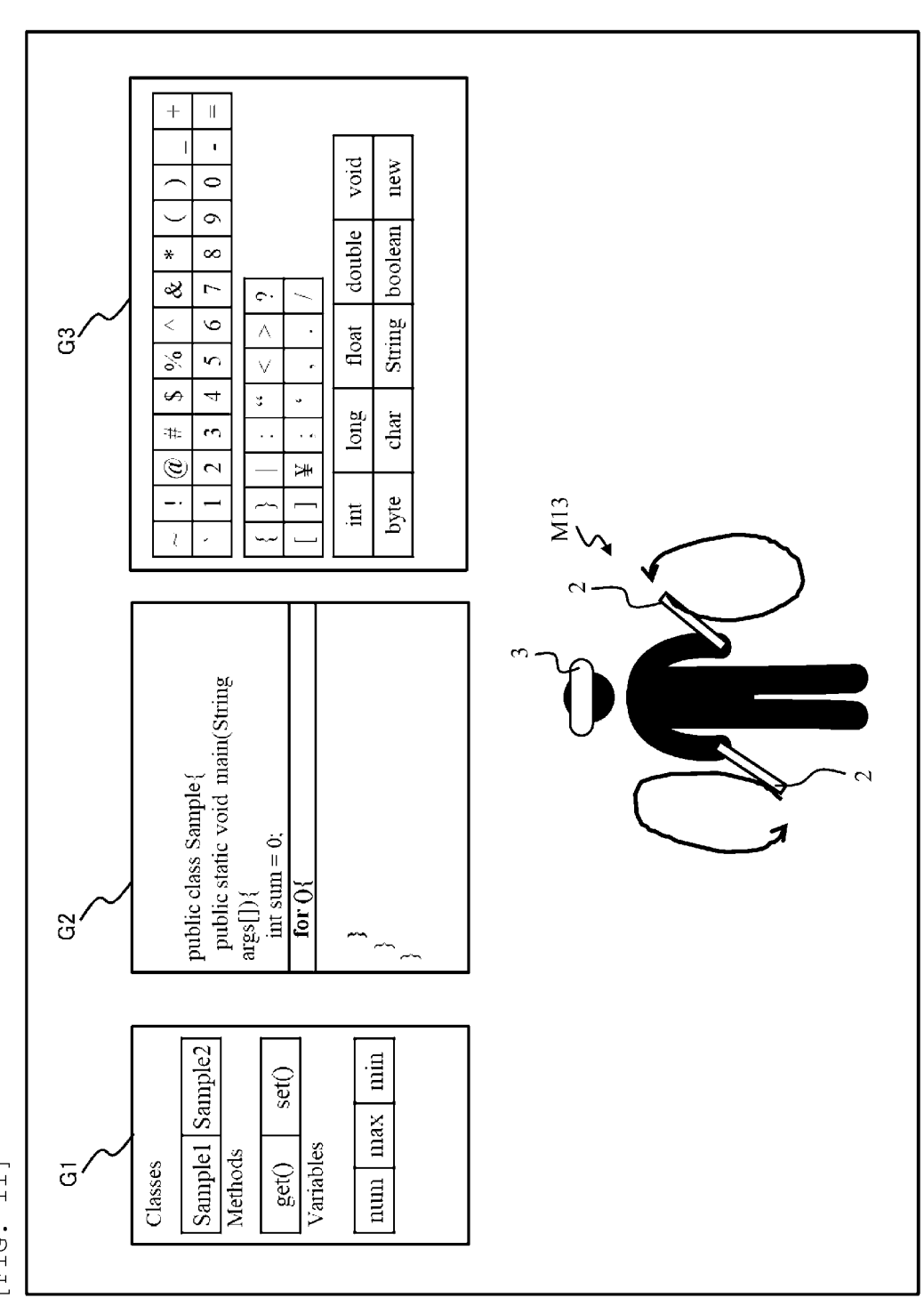

| | SIMILARITY A | SIMILARITY B | SIMILARITY C | NEXT MOTION PROBABILITY | SCORE |
|---|---|---|---|---|---|
| CLASS | 0.35 | 0.37 | 0.32 | 0.01 | 0.0035 |
| MAIN | 0.24 | 0.23 | 0.14 | 0.00 | 0 |
| IF | 0.52 | 0.51 | 0.63 | 0.18 | 0.0936 |
| ELSE IF | 0.52 | 0.51 | 0.63 | 0.00 | 0 |
| ELSE | 0.37 | 0.35 | 0.31 | 0.00 | 0 |
| SWITCH | 0.22 | 0.53 | 0.25 | 0.11 | 0.0242 |
| CASE | 0.22 | 0.53 | 0.25 | 0.00 | 0 |
| DEFAULT | 0.40 | 0.21 | 0.41 | 0.00 | 0 |
| FOR | 0.98 | 0.97 | 0.88 | 0.23 | 0.2254 |
| WHILE | 0.42 | 0.44 | 0.52 | 0.24 | 0.1008 |
| CONTINUE | 0.35 | 0.37 | 0.25 | 0.00 | 0 |
| BREAK | 0.14 | 0.19 | 0.34 | 0.00 | 0 |
| PRINTLN | 0.67 | 0.57 | 0.47 | 0.12 | 0.0804 |
| COMMENT | 0.14 | 0.34 | 0.34 | 0.11 | 0.0154 |

[FIG. 13]
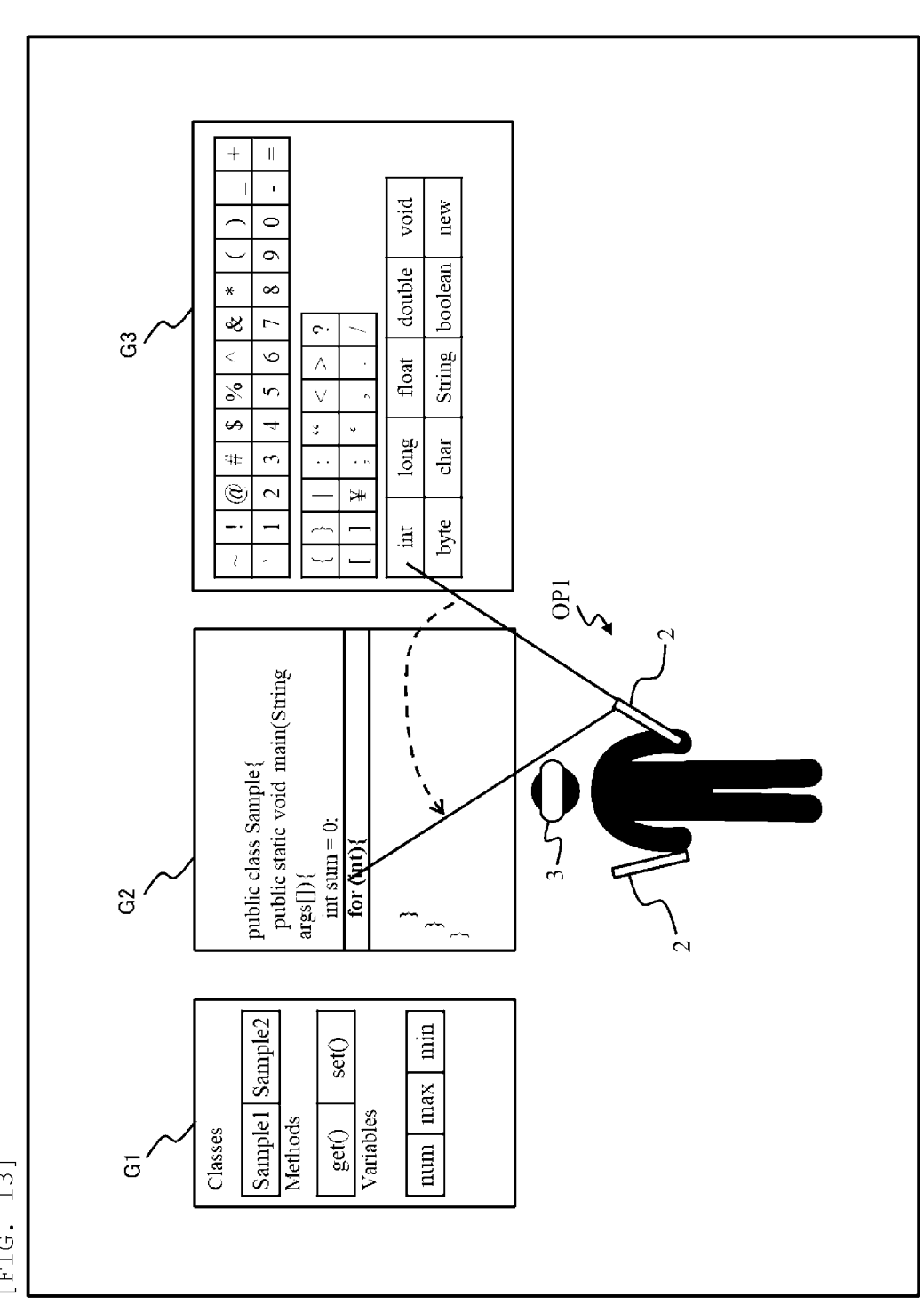

[FIG. 14]

[FIG. 15]
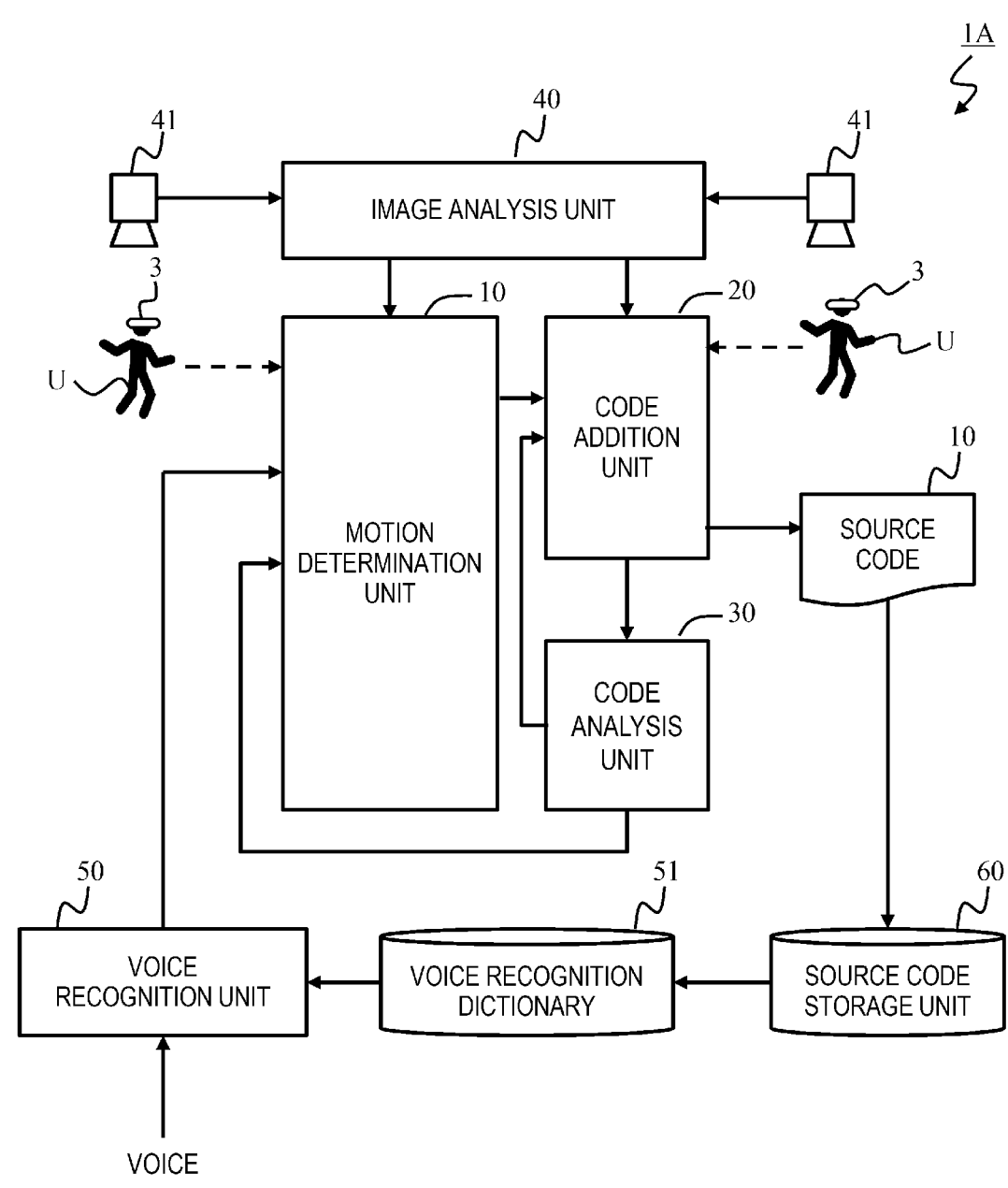

VIRTUAL REALITY BASED PROGRAMMING SUPPORT SYSTEM AND METHOD

TECHNICAL FIELD

The present invention relates to an information expression creation support device, an information expression creation support method, and a computer program.

BACKGROUND ART

In programming work in software development, a code content is generally input by typing a keyboard. However, there is a possibility that the code content can be input more accurately and quickly by inputting the code content using a method that is not limited to the typing of a keyboard.

Although not a technique related to programming, PTL 1 discloses that a notification operation corresponding to a movement trajectory of fingertips is executed by indicating movement of the fingertips to a camera.

CITATION LIST

Patent Literature

PTL 1: JP2012-160204A

SUMMARY OF INVENTION

Technical Problem

The technique disclosed in PTL 1 is merely a technique for detecting an input operation to a mobile terminal by capturing the movement trajectory of the fingertips of the user using a camera, and cannot support the programming work which is creation work for creating an editable information expression.

That is, the technique disclosed in PTL 1 is merely a technique for operating a mobile terminal, and thus an input method is limited and the technique disclosed in PTL 1 cannot be used in a field of supporting the creation of the editable information expression, such as a computer program.

The invention is made in view of the above problems, and an object of the invention is to provide an information expression creation support device, an information expression creation support method, and a computer program capable of supporting creation of an editable information expression of a predetermined language in a virtual reality space based on a movement trajectory of an action of a creator.

Solution to Problem

In order to solve the problems described above, an information expression creation support device according to the invention is a creation support device for supporting creation of an editable information expression of a predetermined language in a virtual reality space. An information expression is selected from candidates of the information expression, which are prepared in advance, based on an acquired movement trajectory of an action of a creator, and the selected information expression is arranged at a predetermined position.

Advantageous Effects of Invention

According to the invention, the creation of the editable information expression of the predetermined language can be supported in the virtual reality space based on the movement trajectory of the action of the creator.

BRIEF DESCRIPTION OF DRAWINGS

FIG. 1 is an explanatory diagram illustrating an overall outline of the present embodiment.

FIG. 2 is a system configuration diagram when an information expression creation support device is implemented using a computer.

FIG. 3 is a functional configuration diagram of the information expression creation support device.

FIG. 4 is an example of a post-interpolation trajectory coordinate log.

FIG. 5 is an example of a table illustrating a motion coordinate definition.

FIG. 6 is an example of axis setting.

FIG. 7 is an example of a table illustrating a correspondence relation between a motion and a code content.

FIG. 8 is an example of a table illustrating a tendency of a content of an input code.

FIG. 9 is an example of a table illustrating a correspondence relation of the code content and a code addition location in each line.

FIG. 10 is a flowchart illustrating motion determination processing.

FIG. 11 is an explanatory diagram illustrating a state in which a creator performs programming by an action.

FIG. 12 is an example of a table illustrating a calculation process of the motion determination.

FIG. 13 is an explanatory diagram illustrating a state in which the programming is performed by first designating a line to which a code is added and dragging and dropping the code according to the action of the creator.

Figure 14:
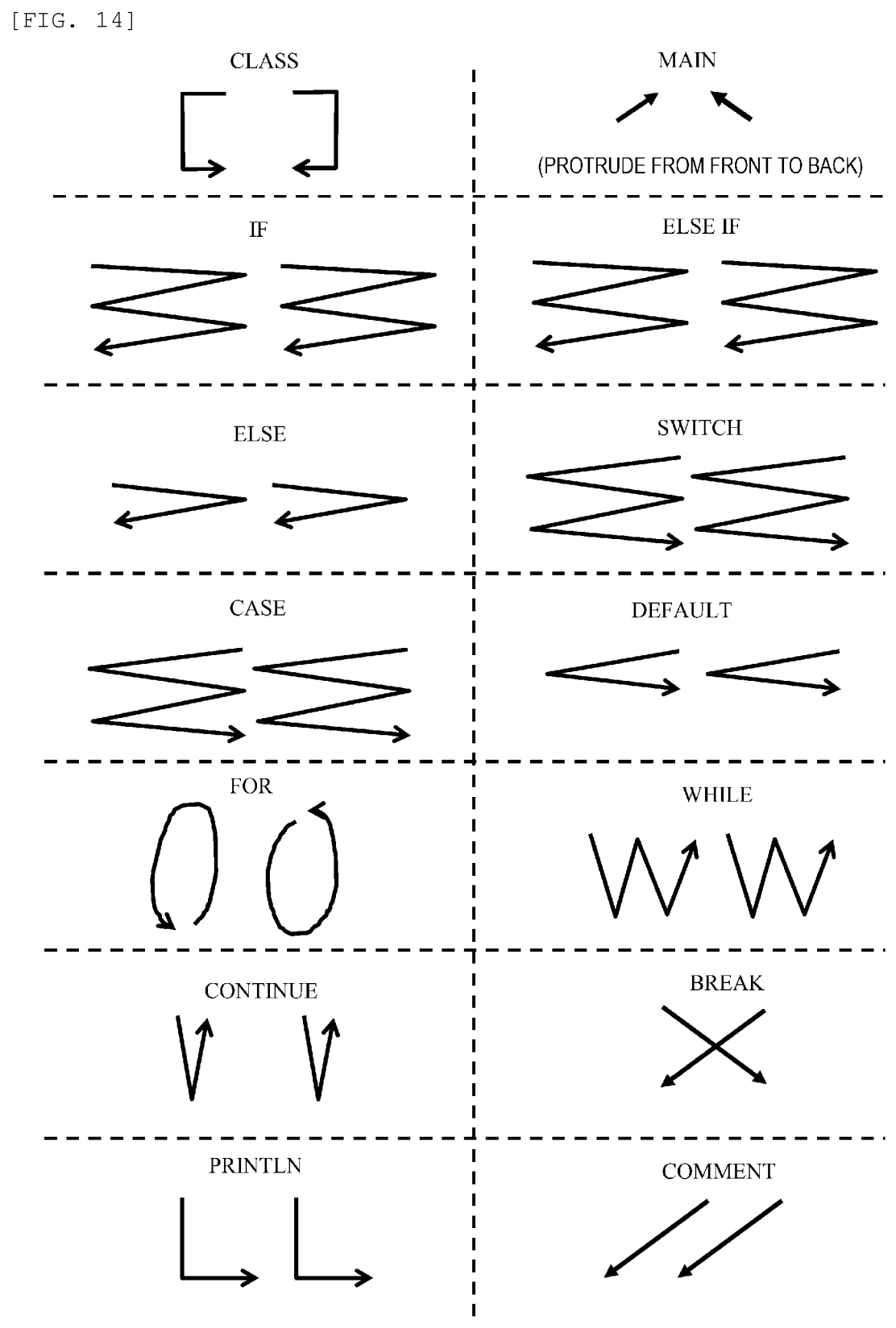

FIG. 14 is an explanatory diagram illustrating an example of the action (motion) of the creator.

FIG. 15 is an overall outline diagram of an information expression creation support device according to a second embodiment.

DESCRIPTION OF EMBODIMENTS

Hereinafter, an embodiment of the invention will be described with reference to the drawings. In the present embodiment, a creator can create an editable information expression according to his/her own movement. Therefore, the creator can create the information expression while exercising, and can reduce lack of exercise.

An editable information expression of a predetermined language is information expressed in an editable manner using a vocabulary and grammar of the predetermined language, and corresponds to, for example, a computer program (source code). In this case, the predetermined language is a programming language. The programming language includes the source code and an object code, and in the present embodiment, a case of an application to the source code will be described. In addition to supporting creation of a computer program, the present embodiment can also support creation of a Japanese or foreign language sentence based on a movement trajectory of an action of the creator.

The creator is a person who creates an information expression, and is not limited to one person. A plurality of creators can also create one information expression in cooperation. Each creator can log in to a common virtual reality space (VR space) and create the information expression substantially simultaneously in cooperation regardless of a physical position of each creator.

The movement trajectory of the action of the creator is, for example, a trajectory of a movement of a body of the creator such as a hand, a foot, and a head of the creator. For example, a position change of a part of the body of the creator, such as the creator raising one hand or both hands overhead or turning one hand or both hands, is acquired as the movement trajectory.

The movement trajectory of the action of the creator may be directly detected by a sensor such as a camera, or a tracking marker may be provided on a part (for example, a hand or a foot) of the body moved by the creator, and the movement trajectory may be indirectly detected via the tracking marker. A radio wave transmitted from the tracking marker is received by a plurality of antennas arranged around the creator, and thus a position change per unit time of the tracking marker can be acquired as the movement trajectory of the action of the creator.

A controller for operating a pointer in the virtual reality space may be provided for the part of the body moved by the creator. For example, the creator can provide the movement trajectory of the action of the creator to an information expression creation support device by holding, with both hands, controllers each of which may be of various shapes such as a handle type, a stick type, and a ring type, and raising or lowering or rotating the controllers. The creator can input an instruction such as "confirm" or "cancel" to the information expression creation support device by operating a physical switch provided on the controller.

Since a handy type controller held by the creator has some weight, an exercise amount in a case where the creator provides the movement trajectory of the action to the information expression creation support device is increased as compared with a case where no controller is used. As compared with the case where one controller is used, the movement trajectory of the action of the creator can be accurately detected. Further, by providing the controller with an authentication function in a case of using the controller such as fingerprint authentication or password authentication, it is possible to prevent falsification of the information expression in the virtual reality space by an unauthorized third party.

In the present embodiment, by using a three-dimensional movement trajectory, it is possible to increase the number of movement trajectories of actions that can be defined. Further, in the present embodiment, by using movement trajectories of a plurality of parts (for example, both hands) of the body of the creator, it is possible to further increase the number of the defined movement trajectories. As a result, it is possible to assign a fixed phrase (command or function) frequently used in the programming language to the movement trajectory of the action, and thus programming work based on the movement trajectory of the action of the creator becomes easy.

In the present embodiment, the creator can also operate a virtual operation panel displayed in the virtual reality space by the movement trajectory of the action of the creator. Therefore, by using the virtual operation panel, the creator can, for example, define a function, declare a variable, or set a value, and input efficiency is increased.

In the present embodiment, when the source code, which is a part of the information expression, or a part of the source code (hereinafter, the source code may be referred to as a code, and a part of the source code may be referred to as a code fragment) is input, a position of the code or code fragment can be instructed using the movement trajectory of the action of the creator. Further, in the present embodiment, it is also possible to determine the position of the code fragment by analyzing a code already input within an arrangement-possible range designated by the creator. That is, in the present embodiment, in a case of designating a range for inputting the code fragment, a position where an input target code fragment is to be placed is determined by analyzing a code within the range (or analyzing a code within a predetermined range including the range and a bit larger than the range). For example, in a case where an integer is an input target code fragment and only one location to which the integer is to be input is present within the arrangement-possible range designated by the creator, a position of the input target integer is determined.

In the present embodiment, when the movement trajectory of the action of the creator matches any one of predetermined movement trajectories set in advance, a predetermined information expression (code) is selected. That is, the creator can input a desired code by performing an operation corresponding to the code. The information expression creation support device according to the present embodiment focuses on coordinate axes necessary for determining that the movement trajectory of the action of the creator is the predetermined movement trajectory, and analyzes the movement trajectory of the action of the creator. That is, when straightly raising or lowering both hands is the predetermined movement trajectory, the information expression creation support device determines whether the movement trajectory of the action of the creator is the predetermined movement trajectory based on a temporal change in a Z-axis coordinate in the movement trajectory of the action of the creator. Therefore, it is possible to accurately determine whether the movement trajectory of the action of the creator is the predetermined movement trajectory even in a case of an action having a large individual difference.

In the present embodiment, it is possible to output calculation process for determining whether the movement trajectory of the action of the creator matches the predetermined movement trajectory. Therefore, the creator can confirm which part of his/her action is to be improved, and usability for the creator is improved.

The features disclosed in the present embodiment can be understood as a device, a method, a computer program for implementing the device or the method, and a recording medium for recording the computer program. Further, combinations other than those explicitly stated in the claims are also included in the present disclosure.

As described above, when the programming is performed in the virtual reality space, the information expression creation support device according to the present embodiment determines, based on a three-dimensional movement trajectory of a body action, a code content to be input, so that the creator can easily perform the programming without using an input device in the related art.

The present disclosure includes configurations of the following aspects. That is, in the present disclosure, when the programming is performed, the code content to be input is determined based on the three-dimensional movement trajectory of the body action, and thus the programming can be easily performed without using an input device in the related art.

In the present disclosure, input accuracy is improved by interpreting a code content already input and excluding a code content not to be input next time grammatically from prediction candidates.

In the present disclosure, the input accuracy is improved by interpreting the code content already input and increasing a weighting for a code content that is likely to be input next time due to a past tendency.

In the present disclosure, an insertion location of the input code content can be easily and accurately determined by combining rough position designation performed by the user and determination of a detailed position based on interpretation of the code content.

In the present disclosure, in order to reduce the individual difference of the movement trajectory of the creator, one or more coordinate axes to be viewed are set for each action constituting the movement trajectory, and thus the input accuracy is improved.

In the present disclosure, the calculation process up to code content determination is displayed, and thus it is easy to execute measures for improving the input accuracy.

Hereinafter, embodiments will be described with reference to the drawings. It should be noted that the embodiments described below do not limit the invention according to the claims. In addition, all of the elements and the combinations thereof described in the embodiments are not necessarily indispensable to the solution of the invention.

First Embodiment

A first embodiment will be described with reference to FIGS. 1 to 14. FIG. 1 is an overall outline diagram of an information expression creation support device. Hereinafter, an input support device 1 that supports programming work will be described as an example of the information expression creation support device.

As illustrated in the upper part of FIG. 1, the input support device 1 includes, for example, a motion determination unit 10, a code addition unit 20, and a code analysis unit 30. Details of the units 10, 20, and 30 will be described later with reference to FIG. 3. A creator U of a source code SC holds controllers 2, for example, with both hands, and wears a headset 3 on the head. The controllers 2 and the headset 3 are connected to the input support device 1 by wireless communication.

The controllers 2 transmit movements of the hands of the creator to the motion determination unit 10. The controller 2 includes a manual switch (not illustrated) that notifies the motion determination unit 10 of confirmation, cancellation, or the like. The headset 3 is a headset for virtual reality (VR), and provides a virtual three-dimensional space in a field of view of the creator. The headset 3 may also be referred to as VR goggles.

When the creator performs a predetermined action using the controllers 2, the motion determination unit 10 acquires a movement trajectory of the predetermined action and determines whether the movement trajectory matches any one of predetermined movement trajectories (hereinafter, also referred to as motions).

The code addition unit 20 identifies a code content that the creator intends to input (may also be referred to as an input target code content or an addition target code content) based on a determination result of the motion determination unit and adds (inputs) the code content at a predetermined position. The code addition unit 20 may also be referred to as a code editing unit 20.

The code analysis unit 30 analyzes an added code content (input code content, and the same applies hereinafter) to calculate a tendency of a code content to be added and an addition position of the code content. The code analysis unit may also be referred to as a code content and code addition position prediction unit.

The lower part of FIG. 1 illustrates a state in which the creator U moves the controllers 2 to input a desired code content at a desired position. The input support device 1 supports code input by a plurality of methods described below.

A first method M1 is a method of selecting and inputting, by a movement trajectory (motion) of an action of the creator, one desired fixed phrase from fixed phrases registered in the input support device 1 in advance. The fixed phrase may be directly selected and input to the input support device 1 by a predetermined motion performed by the creator.

In a second method M2, the creator selects a code content (for example, a variable, a function, a type, or a value having a high using frequency) in an operation panel in the virtual reality space by movements of the controllers, and can thus indirectly input the desired code content via the virtual operation panel. For example, the creator can perform an action as if grabbing the desired code content from code contents displayed on the virtual operation panel via the controllers 2 held by both hands to input the code content.

A third method M3 is a method used to declare a function and a variable, and is a method of recognizing and inputting a voice of the creator. By using voice input, it is possible to declare a function and a variable more efficiently than operating a virtual keyboard in the virtual reality space.

FIG. 2 is an example of a computer system for implementing the input support device 1. This system includes, for example, a computer 100 and a user side device 200. The computer 100 includes, for example, a microprocessor (CPU in the drawing) 101, a memory 102, a storage device 103, a communication unit 104, and a user interface (UI in the drawing) unit 105.

The storage device 103 stores computer programs for implementing the motion determination unit 10, the code addition unit 20, and the code analysis unit 30, and a table T used by the units 10, 20, and 30. The table T is a general term for tables T1 to T6 which will be described later. The microprocessor 101 reads and executes the computer programs stored in the storage device 103 into the memory 102, thereby implementing the motion determination unit 10, the code addition unit 20, and the code analysis unit 30.

The user interface unit 105 has a function of communicating with the user side device 200 worn by the creator U. The user side device 200 is a general term for devices worn by the creator, and includes, for example, the controllers 2 and the headset 3 here. The controller 2 is a device for the creator to input information to the computer 100 (input support device 1). The headset 3 provides the information from the computer 100 (input support device 1) to the creator.

The communication unit 104 connects the computer 100 and an external device 300 via a communication network CN that is the Internet or a dedicated line. The external device 300 is, for example, another computer, a storage device, or a file server. The computer programs or data stored in the storage device 103 may be transmitted to the external device 300. Conversely, the computer program or data may be transferred from the external device 300 to the storage device 103 and stored in the storage device 103.

A storage medium MM is a storage medium that non-temporarily stores a computer program and data, such as a semiconductor memory, a hard disk, an optical disk, a magnetic disk, a magneto-optical disk, and a magnetic tape.

The computer programs stored in the storage device 103 may be transferred to and stored in the storage medium MM, and the storage medium MM may be distributed. Conversely, a computer program stored in the storage medium MM may also be transferred to and stored in the storage device 103.

FIG. 3 illustrates a functional configuration of the input support device 1. A flow of processing performed by the input support device 1 will be described with reference to FIG. 3. The input support device 1 includes, for example, the motion determination unit 10, the code addition unit 20, and the code analysis unit 30.

In input trajectory coordinate acquisition processing 11, the motion determination unit 10 receives motion execution M11 of the creator U, and acquires trajectory coordinates input based on an action of the controller 2. In input trajectory coordinate normalization processing 12, the motion determination unit 10 normalizes the input trajectory coordinates. In input trajectory coordinate interpolation processing 13, the motion determination unit 10 interpolates the input trajectory coordinates and outputs a post-interpolation trajectory coordinate log T1. The post-interpolation trajectory coordinate log T1 will be described later with reference to FIG. 4.

In motion determination processing 14, the motion determination unit 10 receives a motion coordinate definition T2, an axis setting T3, and a processing result of a next motion probability calculation 32, and determines the motion which is the movement trajectory of the action of the creator. The motion coordinate definition T2 will be described later with reference to FIG. 5. The axis setting T3 will be described later with reference to FIG. 6.

In addition code content determination processing 21, the code addition unit 20 receives a processing result of the motion determination processing 14 and a motion and code content correspondence table T4, and determines a code content to be added.

In code addition location determination processing 22 for determining a location for adding the code content, the code addition unit 20 receives a processing result of code addition line determination processing 24 and a processing result of each line code addition location calculation processing 33, and determines a position for adding the code content. The processing 24 is processing for determining a line for adding the code content. The processing 33 is processing for calculating a location (position) for adding the code content in each line.

In code addition execution processing 23, the code addition unit 20 adds the code content at a predetermined position, and outputs an updated source code SC.

In the code addition line determination processing 24 executed by the code addition unit 20, code addition line selection execution M12 of the creator is received, and a line to which the code content is to be added is determined. The creator may move the controllers 2 to designate a position in the source code to which the code content is to be added. The creator may accurately designate the position for adding the code content, and may not designate the position. The creator may designate an approximate position (arrangement-possible range). The code addition unit 20 may calculate, within the arrangement-possible range designated by the creator, a correct position desired by the creator and to which the code content is to be added. When a plurality of positions to which the code content is to be added are calculated, the creator may select one.

In code analysis processing 31, the code analysis unit 30 receives a processing result of the code addition execution processing 23 and executes code analysis.

The next motion probability calculation processing 32 for calculating a probability of a motion to be input next by the creator and processing 33 for calculating the location for adding the code content in each line are executed in parallel.

In the next motion probability calculation processing 32, a table T5 that illustrates a tendency of an input code content is received, and a probability of a next motion is calculated. In the each line code addition location calculation processing 33, the correspondence table T6 between the code content and an addition location of the code content in each line is received, and the addition location of the code content in each line is calculated.

FIG. 4 illustrates an example of the post-interpolation trajectory coordinate log T1. The post-interpolation trajectory coordinate log T1 includes, for example, a motion occurrence time C11 column, a right and left C12 column, an axis C13 column, and a post-interpolation trajectory coordinate C14 column.

In the log T1, for one motion, one motion occurrence time defined by the motion occurrence time C11 column and one right hand and one left hand each defined by the right and left C12 column are present. Further, for each of the right hand and the left hand, one X-axis, one Y-axis, and one Z-axis defined by the axis C13 column are present. For one axis, one post-interpolation trajectory coordinate group defined by the post-interpolation trajectory coordinate C14 column is present. A line C15 represents that an actually existing line is omitted for convenience of description.

FIG. 5 is an example of the motion coordinate definition T2. The motion coordinate definition T2 includes, for example, a motion name C21 column, a motion number C22 column, a right and left C23 column, an axis C24 column, and a trajectory coordinate C25 column.

For one motion, one motion name defined by the motion name C21 column is present. For one motion name, one or more motion numbers defined by the motion number C22 column are present. For one motion number, one right hand and one left hand defined by the right and left C23 column are present. For each of the right hand and the left hand, one X-axis, one Y-axis, and one Z-axis defined by the axis C24 column are present. For one axis, one trajectory coordinate group defined by the trajectory coordinate C25 column is present.

A line C26 and a line C27 represent that actually existing lines are omitted for convenience of description. As contents of the right and left C23 column, the axis C24 column, and the post-interpolation trajectory coordinate C25 column, contents of the right and left C12 column, the axis C13 column, and the post-interpolation trajectory coordinate C14 column of the post-interpolation trajectory coordinate log T1 may be used. That is, it is possible to create the motion coordinate definition T2 using the post-interpolation trajectory coordinate log T1.

FIG. 6 illustrates an example of the axis setting T3. The axis setting T3 includes, for example, a motion name T31 column, an axis T32 column, and a value T33 column. For one motion name, one X-axis, one Y-axis, and one Z-axis defined by the axis T32 column are present. For one axis, one value defined by the value T33 column is present. In the value T33 column, only a value of ON or OFF is allowed as a value. A line T34 represents that an actually existing line is omitted for convenience of description.

FIG. 7 illustrates an example of the motion and code content correspondence table T4. The motion and code content correspondence table T4 includes, for example, a motion name C41 column and a code content C42 column. For one motion name, one code content defined by the code content C42 column is present. In the code content C42 column, a code content corresponding to a motion name is described corresponding to the programming language.

FIG. 8 illustrates an example of the input code content tendency T5. The input code content tendency table T5 includes, for example, an analysis result C51 column, a next motion candidate C52 column, and an occurrence probability C53 column. For one analysis result, next motion candidates defined by the next motion candidate C52 column are present, and the number of the next motion candidates is the same as the number of motion names described in the motion name C21 column in the motion coordinate definition T2. For one next motion candidate, one occurrence probability defined by the occurrence probability C53 column is present. The input code content tendency T5 may be created based on an analysis result of codes already input by the input support device 1, or may be created using data in an external repository.

FIG. 9 illustrates an example of the code content and each line code addition location correspondence table T6. The code content and each line code addition location correspondence table T6 includes, for example, a line pattern C61 column and an input location C62 column.

For one line pattern, one input location defined by the input location C62 column is present. The line pattern C61 column may describe one example representing a pattern, or may describe a normal expression. In the input location C62 column, an input location in the line pattern C61 column may be described using a meta character indicating a black rectangle or the like, or may be described using a number indicating the number of characters from the left. The code content and each line code addition location correspondence table T6 may be created based on the analysis result of the codes already input by the input support device 1, may be created using the data in the external repository, or may be created manually.

Actions in the motion determination processing 14 will be described with reference to a flowchart in FIG. 10. In the motion determination processing 14, post-interpolation trajectory coordinates serving as a result of the input trajectory coordinate interpolation processing 13 are acquired (S11). Hereinafter, the motion determination processing 14 may be referred to as the present processing 14.

In the present processing 14, the motion coordinate definition T2 is acquired (S12), and the axis setting T3 is acquired (S13). Then, in the present processing 14, a next motion probability serving as a result of the next motion probability calculation processing 32 is acquired (S14).

In the present processing 14, a loop of subsequent processing is executed for all motion names M in the motion coordinate definition T2 (S15). In the present processing 14, a loop of subsequent processing is executed for all motion numbers N for which the motion name in the motion coordinate definition T2 is "M" (S16).

In the present processing 14, a similarity between trajectory coordinates of the motion number N of the motion name M in the motion coordinate definition T2 and the post-interpolation trajectory coordinates is calculated by using an axis whose value in the motion name M in the axis setting T3 is "ON". As a method of calculating the similarity, a Euclidean distance or a cosine similarity may be used, or the similarity may be calculated by another method. A plurality of types of similarities may be obtained in parallel (S17).

In the present processing 14, a score for the motion number N of the motion name M in the motion coordinate definition T2 is calculated based on the similarity calculated in step S17 and a next motion probability for the motion name M (S18). As a method of calculating the score, for example, the score may be obtained by multiplying the similarity by the next motion probability, or may be calculated by another method.

The present processing 14 returns to step S16 at a start of the loop (S19). Subsequently, the present processing 14 returns to step S15 at a start of the loop (S20).

In the present processing 14, one motion name is determined based on scores of all motion numbers of all motion names (S21). As a method of determining the motion name, a motion name having a motion number having the highest score value may be selected, or an average value of scores of the motion numbers may be calculated for each motion and a motion name having the largest average value may be selected. Alternatively, all motions and all motion numbers each having a score equal to or greater than a certain value may be counted for each motion name, and a motion name having the largest number of motion names may be selected. Another method may be used.

FIG. 11 illustrates an example of a state in which the code is input using the input support device 1 in the VR space. A code content defined by the creator in the programming is displayed on a screen G1. A source code being input is displayed on a screen G2. That is, the screen G2 is a display form of the updated source code SC. A code content frequently used in the programming is displayed on a screen G3. A motion M13 is an action executed by the creator in the VR space. That is, the motion M13 is a form of the motion execution M11 described above.

FIG. 12 illustrates a calculation result T7 of the motion determination processing 14. This calculation result T7 may be displayed together with the screens G1 to G3 illustrated in FIG. 11, or may be displayed on a screen different from the screens G1 to G3.

In the calculation result T7 in FIG. 12, a calculation process is displayed when the creator executes a motion corresponding to a motion name of "FOR". As a result, a code content corresponding to the motion name of "FOR" is input on the screen G2. The next motion probability is a probability that the motion is input.

As described above, in the present embodiment, whether the motion executed by the creator is most similar to any motion of registered motions is determined from a plurality of viewpoints, and the probability that the motion is input is also taken into consideration to calculate the score as a comprehensive determination result. The input support device 1 selects a code content having the highest calculated score. The next motion probability may be obtained by analyzing a source code created in the past.

FIG. 13 illustrates an example of a state in which the code content is input using a method other than the motion in the VR space. An operation OP1 illustrates a state in which the creator inputs the code content using the virtual operation panel in the VR space.

In the example described above, input of only code contents defined in the motion and code content correspondence table T4 is supported. However, input of code contents not defined in the motion and code content correspondence table T4 is also necessary for actual programming. Therefore, in FIG. 13, those undefined code contents are input in the VR space.

The operation OP1 illustrates a state in which "int" displayed on the screen G3 is input by dragging and dropping the "int" on the screen G2. The creator can also input display contents on the screen G1 by dragging and dropping the display contents on the screen G2 in the same manner. The creator can also register a new code content on the screen G1 by defining the code content using voice.

FIG. 14 illustrates an example of correspondence between the motion and the motion name (code content). These correspondence is an example, and does not limit the motion. The illustrated motion is a movement trajectory of the controllers 2 held in both hands of the creator. The same movement may be performed by the right and left hands, or different movements may be performed by the right and left hands. Further, when one code content is input (added), the same motion may be repeatedly performed a plurality of times.

As described above, according to the present embodiment, the code content to be input is determined based on the three-dimensional movement trajectory (motion) of the body action when the programming is executed in the virtual reality space, and thus the creator can easily perform the programming without using an input device in the related art.

In the present embodiment, since the three-dimensional motion is used, it is possible to increase the number of motions that can be defined.

In the present embodiment, since it is possible to assign a fixed phrase (command or function) frequently used in the programming language to the predetermined motion, the programming work based on the motion of the creator in the virtual reality space becomes easy.

In the present embodiment, the creator can also use the virtual operation panel displayed in the virtual reality space by the motion or a direct operation of the creator, and the input efficiency is improved.

In the present embodiment, when the source code is input, the position of the source code can be instructed using the movement trajectory of the action of the creator.

In the present embodiment, it is also possible to determine the position of the code fragment by analyzing the code already input within the arrangement-possible range designated by the creator.

In the present embodiment, coordinate axes necessary for determining that the motion of the creator is the predetermined motion are focused on and the motion executed by the creator is analyzed, and thus the executed motion can be accurately determined even in a case of an action having a large individual difference.

In the present embodiment, it is possible to output the calculation process for determining whether the motion executed by the creator matches the predetermined motion. Therefore, the creator can confirm which part of his/her own action is to be improved, and the usability for the creator is improved.

Hereinafter, modifications of the present embodiment will be described.

(First Modification)

In the input trajectory coordinate acquisition processing 11, as an example of a method of receiving the motion execution M11 of the creator, the creator executes the motion using the controllers 2 that can acquire coordinates. At this time, the creator long-presses a specific button of the controller 2 during the motion execution to transmit to the input support device 1 that the motion is being input.

(Second Modification)

In the input trajectory coordinate normalization processing 12, as an example of the normalization of the coordinates, a size of the movement trajectory is made constant.

Accordingly, decrease in input accuracy due to an individual difference in the size of the movement trajectory by the creator is prevented. As another example, coordinates of a start position of the movement trajectory are aligned with an origin. Accordingly, decrease in the input accuracy due to the difference in the start position is prevented.

(Third Modification)

In the input trajectory coordinate interpolation processing 13, as an example of the interpolation, the coordinates are connected by a line in an input order, and the coordinates through which the line is passed are added to input trajectory coordinates. Accordingly, a difference in a coordinate density due to an input speed is eliminated, and the decrease in the input accuracy is prevented.

(Fourth Modification)

In the code addition line determination processing 24, as an example of a method of receiving the code addition line selection M12 of the creator, the creator selects a code addition line by using the controller 2 in the VR space. For example, the creator may select a line by irradiating the screen G2 with a virtual straight line emitted from the controller 2 in the VR space.

(Fifth Modification)

In the code analysis processing 31, as an example of the code analysis, the code content may be replaced with intermediate expression data, and a specific structure of the intermediate expression data may be regarded as a pattern.

Second Embodiment

FIG. 15 is an overall outline diagram of the input support device 1 according to a second embodiment. In the present embodiment, differences from the first embodiment will be mainly described.

In the present embodiment, the handy type controllers 2 are eliminated, the action of the creator is captured as a moving image by a camera 41, and the moving image is analyzed by an image analysis unit 40. Accordingly, the motion determination unit 10 determines whether a motion that matches a predetermined motion is executed by the creator.

Further, as described in the first embodiment, in the present embodiment, the creator can also input a code content by voice in addition to input by a motion. A voice recognition dictionary 51 used by a voice recognition unit 50 is created by reading and analyzing source codes created in the past and stored in a source code storage unit 60.

The present embodiment constituted in this manner also achieves the same operational effect as that of the first embodiment. Further, according to the present embodiment, the motion can be acquired without using the controllers 2. In the present embodiment, the creator does not need to hold the controllers 2 with both hands, and thus an exercise amount decreases.

The invention is not limited to the above embodiments, and includes various modifications. For example, the embodiments described above have been described in detail for easy understanding of the invention, and the invention is not necessarily limited to those including all of the configurations described above. Further, a part of a configuration of one embodiment can be replaced with a configuration of another embodiment, or the configuration of one embodiment can be added to the configuration of another embodiment. In addition, a part of the configuration of each embodiment may be added to, deleted from, or replaced with another configuration.

REFERENCE SIGNS LIST 1, 1A: input support device
2: controller
3: headset
10: motion determination unit
20: code addition unit
30: code analysis unit

The invention claimed is:

1. A source code creation support device for supporting creation of a source code in a virtual reality space, comprising:
   a processor;
   a display that displays the source code; and
   a storage device, wherein
   the storage device stores a first table that contains, for each of a plurality of predetermined movement trajectories, a corresponding motion name and a second table that contains, for each motion name contained in the first table, a corresponding code content, and the processor:
   acquires a movement trajectory of an action of a creator,
   refers to the first table to determine if the movement trajectory of the action of the creator matches one of the plurality of predetermined movement trajectories and identifies the corresponding motion name contained in the first table,
   refers to the second table to select the corresponding code content contained in the second table for the identified corresponding motion name,
   arranges the selected corresponding code content at a predetermined position in the source code, wherein the predetermined position is determined by
      analyzing the movement trajectory of the action of the creator and the source code already input within an approximate position designated by the creator based on the movement trajectory of the action of the creator, or
      acquiring an input by the creator specifying where to arrange the selected corresponding code content in the source code already input, or
      analyzing the source code already input, wherein
   the processor further displays the source code with the selected corresponding code content arranged at the predetermined position in the source code to the display.

2. The source code creation support device according to claim 1, wherein,
   the processor displays a virtual operation panel in a virtual reality space, wherein,
   when the second table does not contain the corresponding code content for the motion name contained in the first table, the processor accepts an input of the code content based on the creator's voice or a controller operation.

3. The source code creation support device according to claim 1, wherein
   the processor analyzes the source code already input, and when a source code candidate from a plurality of source code candidates, whose possibility of being input next is less than or equal to a predetermined value in terms of grammar of a predetermined language, the processor excludes the source code candidate with the low possibility of being input next from the plurality of source code candidates.

4. The source code creation support device according to claim 1, wherein the processor gives a priority to a source code candidate whose possibility of being input next is greater than or equal to another source code candidate based on an analysis result of the source code already input and an analysis result of a source code created in the past.

5. The source code creation support device according to claim 1, wherein
   the processor sets at least one coordinate axis for comparison based on a temporal change in coordinates on the at least one set coordinate axis in order to determine whether the movement trajectory of the action of the creator matches one of the predetermined movement trajectories having the corresponding motion name stored in the first table.

6. The source code creation support device according to claim 1, wherein
   the processor outputs to the display a calculation result of determining whether the movement trajectory of the action of the creator matches one of the predetermined movement trajectories having the corresponding motion name stored in the first table.

7. A source code creation support method to be executed by a computer to support creation of a source code of a predetermined language in a virtual reality space, the method comprising:
   the computer:
   acquiring a movement trajectory of an action of a creator,
   referring to a first table that contains for each of a plurality of predetermined movement trajectories, a corresponding motion name, to determine if the movement trajectory of the action of the creator match one of the plurality of predetermined movement trajectories and identifies the corresponding motion name contained in the first table,
   referring to a second table that contains for each motion name contained in the first table, a corresponding code content, to select the corresponding code content for the identified motion name,
   arranging the selected corresponding code content at a predetermined position in the source code, wherein the predetermined position is determined by
      analyzing the movement trajectory of the action of the creator and the source code already input within an approximate position designated by the creator based on the movement trajectory of the action of the creator, or
      acquiring input by the creator specifying where to arrange the selected corresponding code content in the source code already input, or
      analyzing the source code already input wherein,
   the method further comprising the computer displaying the source code with the selected corresponding code content arranged at the predetermined position in the source code to a display.

8. A storage device that stores a computer program, a first table, and a second table, wherein, the first table, the second table, and the computer program stored in the storage device may be transferred to and from a non-temporary storage medium, and
   the computer program causes a computer;
   to support creation of a source code in a virtual reality space,
   the storage device storing the first table that contains for each of a plurality of predetermined movement trajectories, a corresponding motion name and the second table that contains for each motion name contained in the first table, a corresponding code content, and the computer program causes a processor of the computer to execute:

a step of acquiring a movement trajectory of an action of a creator, a step of referring to the first table to determine if the movement trajectory of the action of the creator matches one of the plurality of predetermined movement trajectories and identifies the corresponding motion name contained in the first table, a step of referring to the second table to select the corresponding code content for the identified corresponding motion name, a step of arranging the selected corresponding code content at a predetermined position in the source code, wherein the predetermined position is determined by analyzing the movement trajectory of the action of the creator and a source code already input within an approximate position designated by the creator based on the movement trajectory of the action of the creator, or acquiring input by the creator specifying where to arrange the selected corresponding code content in the source code already input, or analyzing the source code already input, wherein, the computer program further causes the processor of the computer to execute a step of displaying the source code with the selected corresponding code content arranged at the predetermined position in the source code to a display.

\* \* \* \* \*